US012651876B2

(12) United States Patent
Mahoney

(10) Patent No.: US 12,651,876 B2
(45) Date of Patent: Jun. 9, 2026

(54) COAXIAL CABLE SEIZURE ASSEMBLY WITH MULTI-PART CONDUCTOR FOR USE IN A HYBRID FIBER-COAXIAL (HFC) NETWORK DEVICE

(71) Applicant: Applied Optoelectronics, Inc., Sugar Land, TX (US)

(72) Inventor: William G. Mahoney, Suwanee, GA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 280 days.

(21) Appl. No.: 18/384,279

(22) Filed: Oct. 26, 2023

(65) Prior Publication Data

US 2025/0141165 A1 May 1, 2025

(51) Int. Cl.
*H01R 24/40* (2011.01)
*H01R 9/05* (2006.01)
*H01R 13/627* (2006.01)

(52) U.S. Cl.
CPC .......... *H01R 24/40* (2013.01); *H01R 9/0503* (2013.01); *H01R 13/6278* (2013.01)

(58) Field of Classification Search
CPC .............................. H01R 24/40; H01R 9/0503
USPC .............................................................. 439/578
See application file for complete search history.

(56) References Cited

U.S. PATENT DOCUMENTS 1,928,916 A 10/1933 Tucker
2,531,625 A 11/1950 Hubbell
6,094,352 A 7/2000 Reddy et al.
6,593,830 B2 7/2003 Wu
6,811,447 B2 11/2004 Pfister et al.
7,625,247 B1 12/2009 Mahoney et al.
8,047,872 B2 11/2011 Burris et al.
10,218,123 B1 2/2019 Mahoney
10,424,424 B2 9/2019 Farrell et al.
11,456,566 B2 9/2022 Mahoney et al.
2006/0281370 A1 12/2006 Mahoney et al.
2013/0012062 A1* 1/2013 Nugent .................. H01R 43/20 439/578
2013/0157503 A1* 6/2013 Sykes .................... H01R 24/44 439/578
2021/0218182 A1 7/2021 Jacobson et al.
2021/0281026 A1* 9/2021 Mahoney ............... H01R 24/44

* cited by examiner

*Primary Examiner* — Tulsidas C Patel
*Assistant Examiner* — Thaslimur Rahman
(74) *Attorney, Agent, or Firm* — Secant IP PLLC

(57) ABSTRACT

A coaxial cable seizure assembly includes a includes a multi-part conductor to provide a coaxial cable connection inside an HFC network device, such as an HFC node or amplifier. The multi-part conductor portion includes a pin portion and separate a socket portion that engages the pin portion. The pin portion and the socket portion are located in an insulator portion. The insulator portion may be located inside a housing of the HFC network device adjacent a coaxial cable port such that the socket portion is aligned with and receives a coaxial cable center conductor pin of a coaxial cable connected to the coaxial cable port. In one embodiment, a coaxial cable seizure assembly includes a pin portion configured to mate with a coaxial RF connector (e.g., a G-type connector) inside the housing.

16 Claims, 6 Drawing Sheets

COAXIAL CABLE SEIZURE ASSEMBLY WITH MULTI-PART CONDUCTOR FOR USE IN A HYBRID FIBER-COAXIAL (HFC) NETWORK DEVICE

TECHNICAL FIELD

The present disclosure relates to coaxial cable connector seizure assemblies, and more particularly, to a coaxial cable seizure assembly with a multi-part conductor for use in a hybrid fiber-coaxial (HFC) network device.

BACKGROUND INFORMATION

Hybrid fiber-coaxial (HFC) networks are used to provide high bandwidth communication between a headend/hub and end users such as homes and businesses. Such HFC networks are often used, for example, to provide cable television (CATV) and internet services to the end users. An HFC network architecture generally includes optical fiber for carrying optical signals (e.g., from the headend/hub), coaxial cables for carrying RF signals (e.g., to the end users), and HFC network devices, such as HFC nodes, amplifiers, and taps, that connect to the optical fiber and/or coaxial cables. The Data Over Cable Service Interface Specification (DOCSIS) has been adopted to standardize continued improvements of existing HFC networks in order to provide additional bandwidth for enhanced TV and Internet services, and there may be a need to upgrade the HFC network infrastructure to meet increasing bandwidth demands, for example, when moving from DOCSIS 3.1 to DOCSIS 4.0.

Connections between HFC network devices and coaxial cables should allow a cable to be relatively easily connected while providing the desired RF performance at the RF frequencies of the HFC network. An HFC network device, such as an HFC node or amplifier, may include a coaxial cable port where the coaxial cable is connected with a cable center conductor pin (also referred to as the "stinger") electrically connected inside the HFC network device using a coaxial cable seizure assembly. The length and contact of that cable center conductor pin may affect the RF connection and performance. As such, the connections between the HFC network devices and the coaxial cables may need to be upgraded as the network moves to a different DOCSIS standard with higher bandwidths and RF frequencies.

SUMMARY

Consistent with one aspect of the present disclosure, a seizure assembly may be used for connecting to a coaxial cable in a hybrid fiber coaxial (HFC) network device. The seizure assembly includes an insulator portion having a first end, a second end and a side. The insulator portion defines a pin passageway extending to the first end and a socket passageway extending from at least the pin passageway to the side. The seizure assembly also includes a pin portion fixed in the pin passageway of the insulator portion and extending from the socket passageway to beyond the first end of the insulator portion such that the pin portion protrudes from the first end. The pin portion has a pin end extending beyond the first end of the insulator portion and has a socket coupling end located in the socket passageway. The socket coupling end defines an aperture and the pin end is configured to mate with a coaxial RF connector in an HFC network device. The seizure assembly further includes a socket portion separate from the pin portion and fixed in the socket passageway in contact with the pin portion. The socket portion has a pin coupling end extending into the aperture in the socket coupling end of the pin portion and has a socket end located at the side of the insulator portion. The socket end defines a cylindrical spring socket configured to receive a coaxial cable center conductor pin.

Consistent with another aspect of the present disclosure, a hybrid fiber coaxial (HFC) network device includes a housing having at least one coaxial cable port configured to connect to a coaxial cable external to the housing and a seizure assembly secured in the housing adjacent to the coaxial cable port such that a coaxial cable center conductor pin of the coaxial cable extends through the coaxial cable port and into the seizure assembly. The seizure assembly includes an insulator portion having a first end, a second end and a side. The insulator portion defines a pin passageway extending to the first end and a socket passageway extending from at least the pin passageway to the side. The seizure assembly also includes a pin portion fixed in the pin passageway of the insulator portion and extending from the socket passageway to beyond the first end of the insulator portion such that the pin portion protrudes from the first end. The pin portion has a pin end extending beyond the first end of the insulator portion and has a socket coupling end located in the socket passageway. The socket coupling end defines an aperture and the pin end is configured to mate with a coaxial RF connector in an HFC network device. The seizure assembly further includes a socket portion separate from the pin portion and fixed in the socket passageway in contact with the pin portion. The socket portion has a pin coupling end extending into the aperture in the socket coupling end of the pin portion and has a socket end located at the side of the insulator portion. The socket end defines a cylindrical spring socket configured to receive a coaxial cable center conductor pin.

BRIEF DESCRIPTION OF THE DRAWINGS

These and other features and advantages will be better understood by reading the following detailed description, taken together with the drawings wherein.

DETAILED DESCRIPTION

A coaxial cable seizure assembly, consistent with embodiments of the present disclosure, includes a multi-part conductor to provide a coaxial cable connection inside an HFC network device, such as an HFC node or amplifier. The multi-part conductor includes a pin portion and separate a socket portion that engages the pin portion. The pin portion and the socket portion are located in an insulator portion. The insulator portion may be located inside a housing of the HFC network device adjacent a coaxial cable port such that the socket portion is aligned with and receives a coaxial cable center conductor pin of a coaxial cable connected to the coaxial cable port. In one embodiment, a coaxial cable seizure assembly includes a pin portion configured to mate with a coaxial RF connector (e.g., a G-type connector) inside the housing.

Older network devices have used a set screw and star washer to secure the coaxial cable center conductor pin, but such connectors required the housing to be opened for installation, and variations in the length of the center conductor pin and torque resulted in performance issues. Newer HFC network devices have used spring-loaded seizure assemblies, which facilitate connection of the coaxial cable center conductor pin but have not adequately resolved other problems such as the center conductor pin length and impedance control. As such, the spring-loaded seizure mechanisms may become a weak RF entry point, especially at higher frequencies (e.g., up to 3 GHZ) required by CATV DOCSIS 4.0 standards.

Other coaxial cable seizure assemblies have used a one-piece conductor, for example, as disclosed in U.S. Pat. No. 11,456,566, which is commonly owned and incorporated herein by reference. Such a one-piece conductor is an improvement over prior set screw and spring-loaded seizure assemblies but may not adequately connect with different sized coaxial cable center conductor pins and may not provide the desired RF performance. In particular, the coaxial cable seizure assembly disclosed in U.S. Pat. No. 11,456,566 may have a more limited range for the diameter and/or length of the coaxial cable center conductor pin.

The coaxial cable seizure assembly including a multi-part conductor, consistent with embodiments of the present disclosure, allows a relatively simple and consistent connection with the coaxial cable center conductor pin and is capable of providing the desired RF performance. The coaxial cable seizure assembly with the multi-part conductor may also be easier to fabricate, as compared to the set-screw and spring-loaded seizure assemblies and the one-piece conductor.

Figure 1:
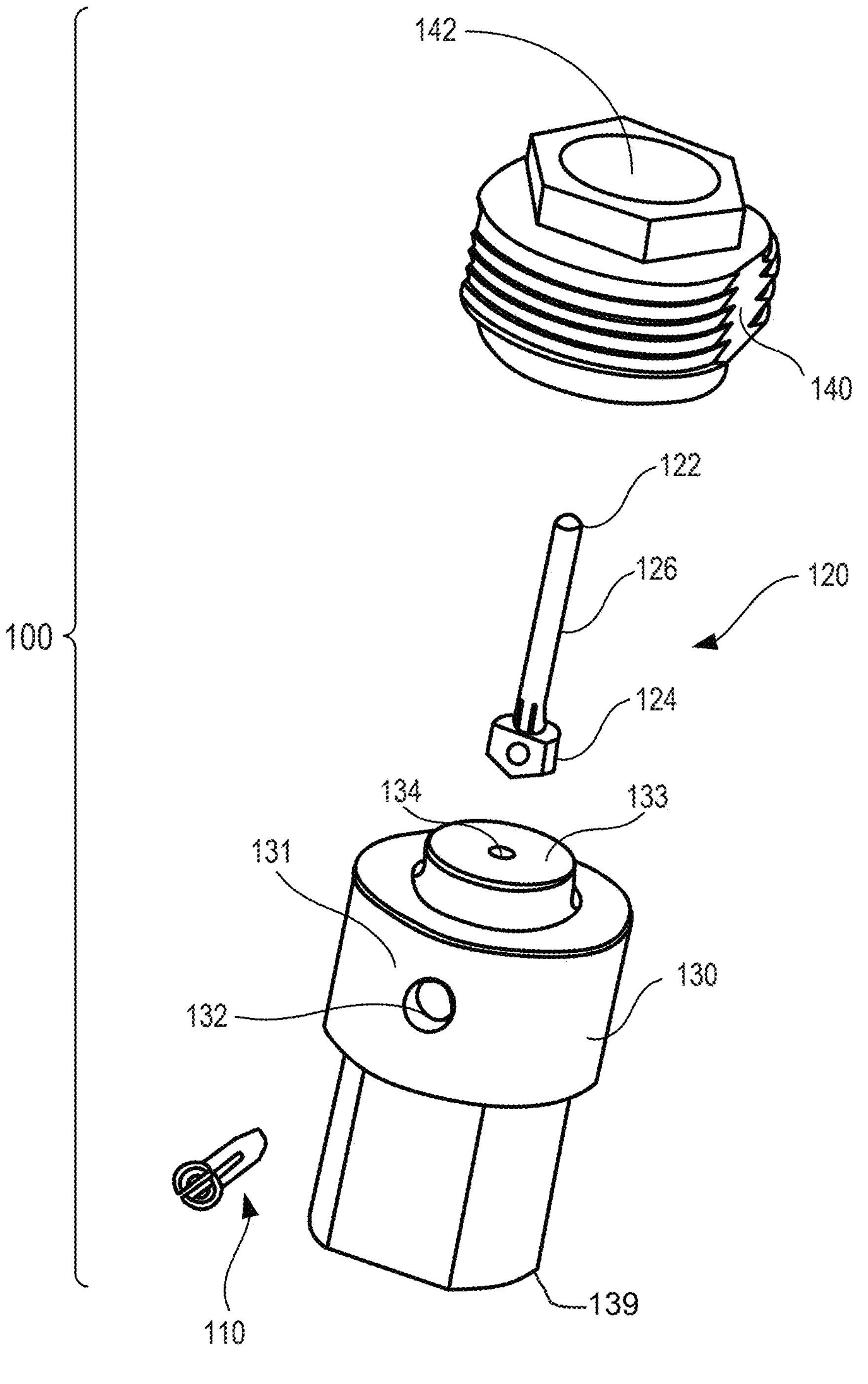
FIG. 1 is an exploded view of a coaxial cable seizure assembly with a multi-part conductor, consistent with embodiments of the present disclosure.
Figure 2:
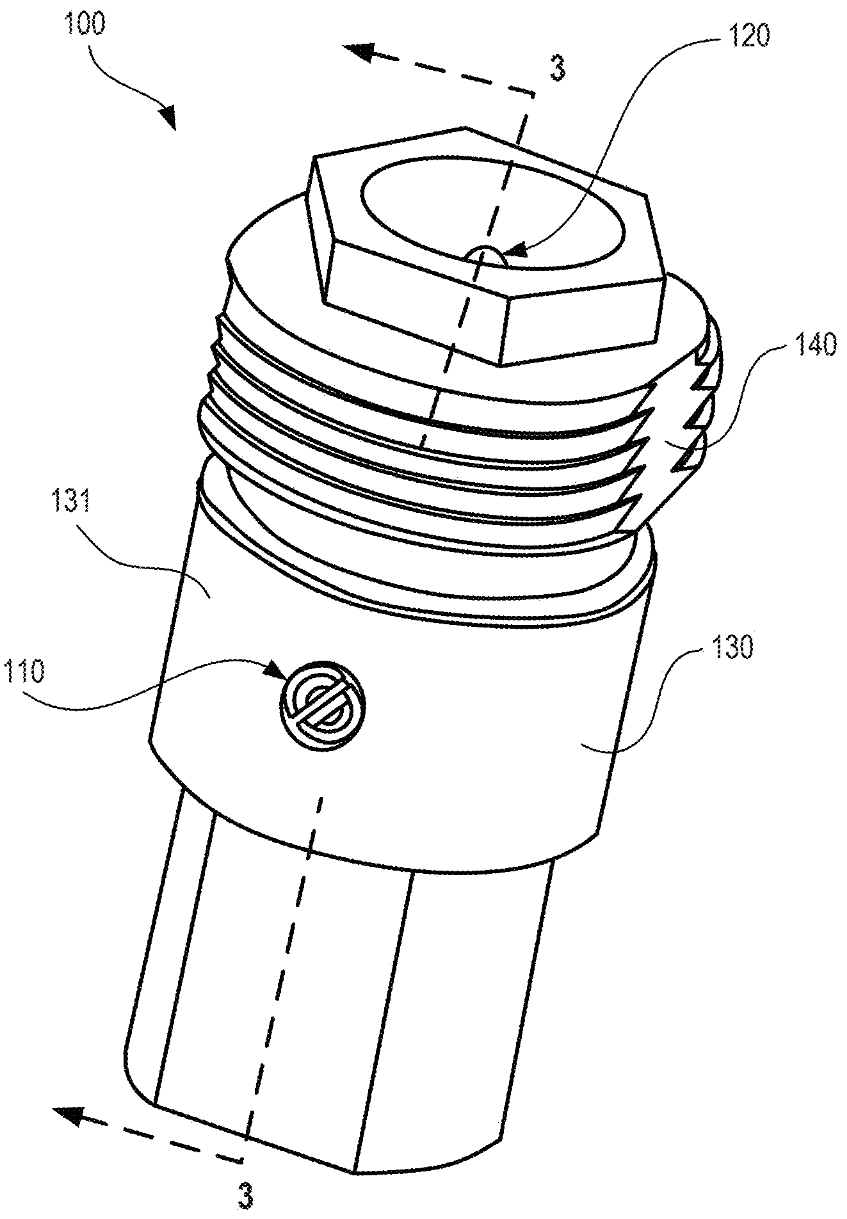
FIG. 2 is a side view of the coaxial cable seizure assembly shown in FIG. 1.
Figure 3:
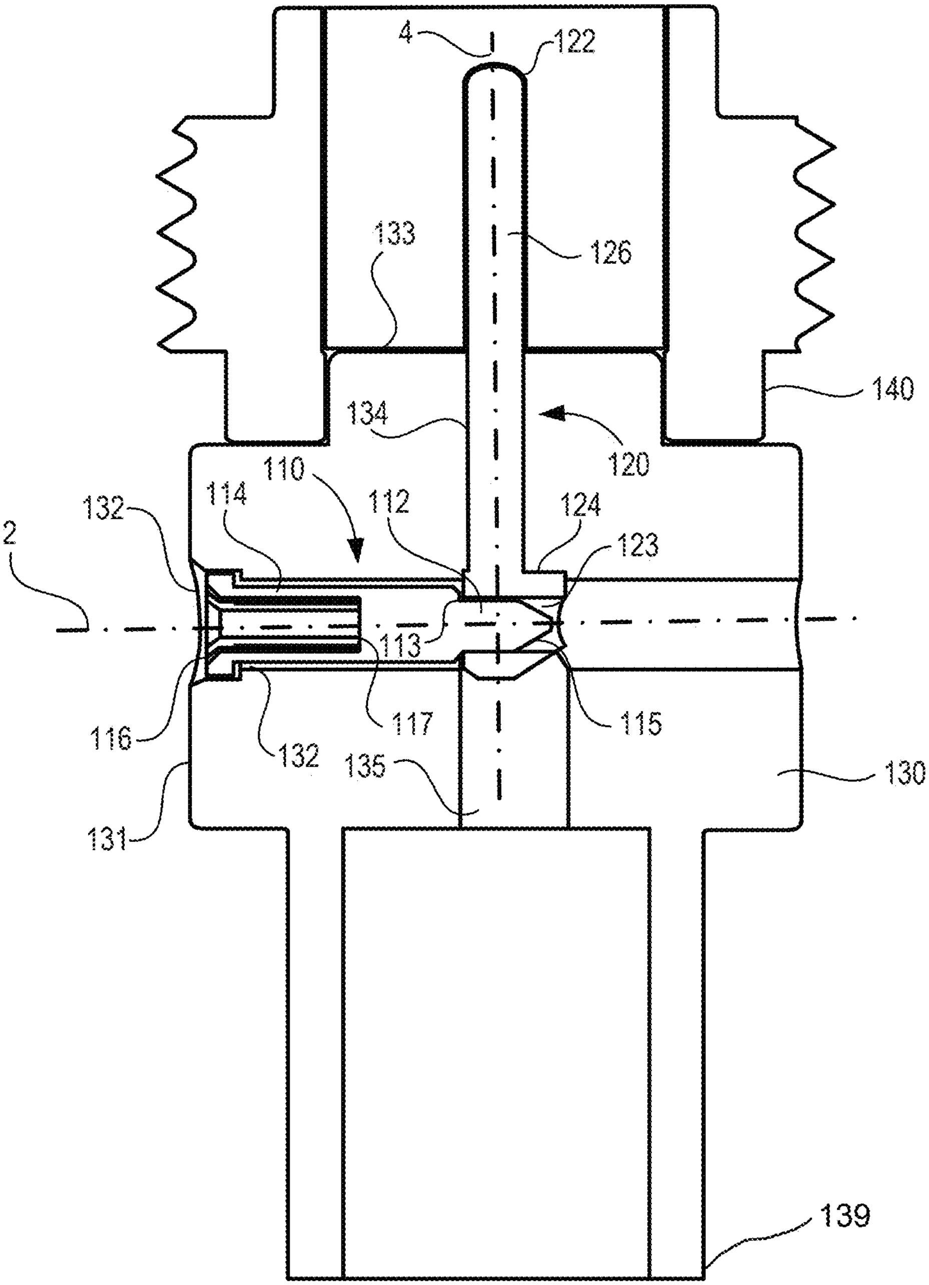
FIG. 3 is a cross-sectional view of the coaxial cable seizure assembly taken along line 3-3 in FIG. 2.

Referring to FIGS. 1-3, an embodiment of a coaxial cable seizure assembly 100 including a multi-part conductor, consistent with the present disclosure, is shown and described in detail. The multi-part conductor includes a socket portion 110 and a pin portion 120 made from separate pieces of conductive material, such as copper. The socket portion 110 and the pin portion 120 of the multi-part conductor are mechanically and electrically connected within an insulator portion 130 such that the socket portion 110 is able to connect with the coaxial cable center conductor pin of a cable outside an HFC network device and the pin portion 120 is able to connect with the coaxial RF connector inside the housing of the HFC network device. The insulator portion 130 includes a first end 133 and a second end 139 and may be made of a dielectric material, such as a plastic material.

In this embodiment of the coaxial cable seizure assembly 100, the insulator portion 130 includes a socket passageway 132 extending from a side 131 of the insulator portion 130 and a pin passageway 134 extending from the socket passageway 132 inside the insulator portion 130 to the first end 133 of the insulator portion 130. The pin portion 120 is fixed in the pin passageway 134 and the socket portion 110 is fixed in the socket passageway 132 with the socket portion 110 being mechanically and electrically connected to the pin portion 120 inside the insulator portion 130.

The insulator portion 130 is configured to be received in a receptacle in the housing of the HFC network device and secured by a lock nut 140, as will be described in greater detail below. The lock nut 140 includes an aperture 142 that defines a receptacle for receiving the coaxial RF connector. The pin portion 120 extends beyond the first end 133 of the insulator portion 130 and into the aperture 142 defined by the lock nut 140. The aperture 142 defined by the lock nut 140 surrounds the pin portion 120 and provides a receptacle configured to receive a coaxial RF connector in the HFC network device, such as a G-type connector, as will be described in greater detail below.

In the illustrated embodiment, as shown in greater detail in FIG. 3, the socket portion 110 includes a pin coupling end 112 and a socket end 114. The socket portion 110 generally has a cylindrical shape and an outer diameter of the pin coupling end 112 is smaller than an outer diameter of the socket end 114 forming a shoulder 113. The pin coupling end 112 may have a tapered portion 115 to facilitate engagement and coupling with the pin portion 120, as will be described in greater detail below. The socket end 114 also defines a socket 116 with a defined depth, which may prevent over insertion of a conductor pin (not shown) of a coaxial cable. The conductor pin contacting a back wall 117 of the socket 116 provides an indication to the user that the conductor pin has been fully inserted. In the illustrated embodiment, the socket end 114 includes a cylindrical spring socket that receives a conductor pin (not shown) of a coaxial cable with a secure friction fit. The socket end 114 thus provides a secure mechanical and electrical connection with the conductor pin of a coaxial cable.

In the illustrated embodiment, the pin portion 120 includes a pin end 122 extending from the insulator portion 130 and a socket coupling end 124 configured to receive the pin coupling end 112 of the socket portion 110 inside the insulator portion 130. In the illustrated embodiment, a longitudinal axis 2 of the socket portion 110 intersects a longitudinal axis 4 of the pin portion 120 substantially perpendicularly (e.g., between about 85°-95°) such that the socket portion 110 and the pin portion 120 are arranged orthogonally. In the illustrated embodiment, the socket coupling end 124 defines an aperture 123 passing through the socket coupling end 122. Alternatively, the socket coupling end 124 may define an aperture that does not pass through and is closed at the back side. When the pin coupling end 112 is fully inserted into the aperture 123, the shoulder 113 abuts the socket coupling end 124. The outer diameter of the pin coupling end 112 and the inner diameter of the aperture 123 in the socket coupling end 122 may be selected to allow an interference fit of the pin coupling end 112 within the aperture 123 of the socket coupling end 122, thereby providing a secure mechanical connection and electrical contact with the pin coupling end 112 circumferentially enclosed by the socket coupling end 122. This connection between the socket portion 110 and the pin portion 120 may allow better return loss, for example, as compared to a one-piece conductor.

The pin end 122 of the pin portion 120 is configured to engage a coaxial RF connector, such as a G-type connector, located in an HFC network device, as will be described in greater detail below. In the illustrated embodiment, the pin portion 120 includes an elongated, cylindrical body 126 and the pin end 122 has a rounded tip, although other shapes and configurations are contemplated and within the scope of the present disclosure.

The multi-part conductor may also facilitate assembly of the coaxial cable seizure assembly 100. For example, the pin portion 120 may be inserted through a bottom aperture 135 of the insulator portion 130 and into the pin passageway 134. The socket portion 110 may then be inserted into the socket passageway 132 of the insulator portion 130 until the pin coupling end 112 of the socket portion 110 engages the socket coupling end 122 and is fully inserted into the aperture 123. Alternatively, the socket portion 110 and the pin portion 120 may be sandwiched between two pieces of plastic forming the insulator portion 130 and are fixed in the insulator portion 130.

Figure 4A:
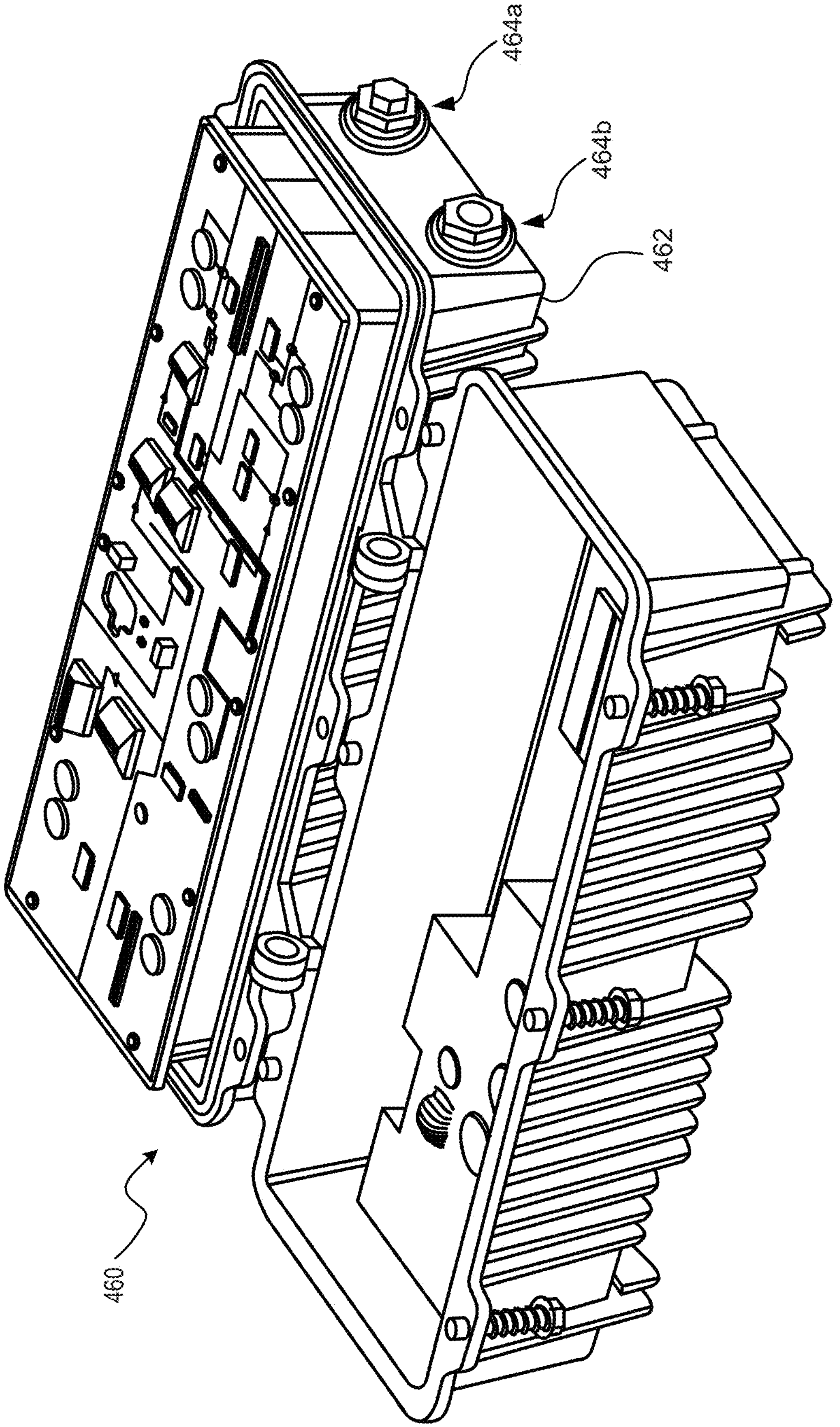
FIG. 4A is a hybrid fiber-coaxial (HFC) network amplifier including a coaxial cable seizure assembly, consistent with an embodiment of the present disclosure.
Figure 4B:
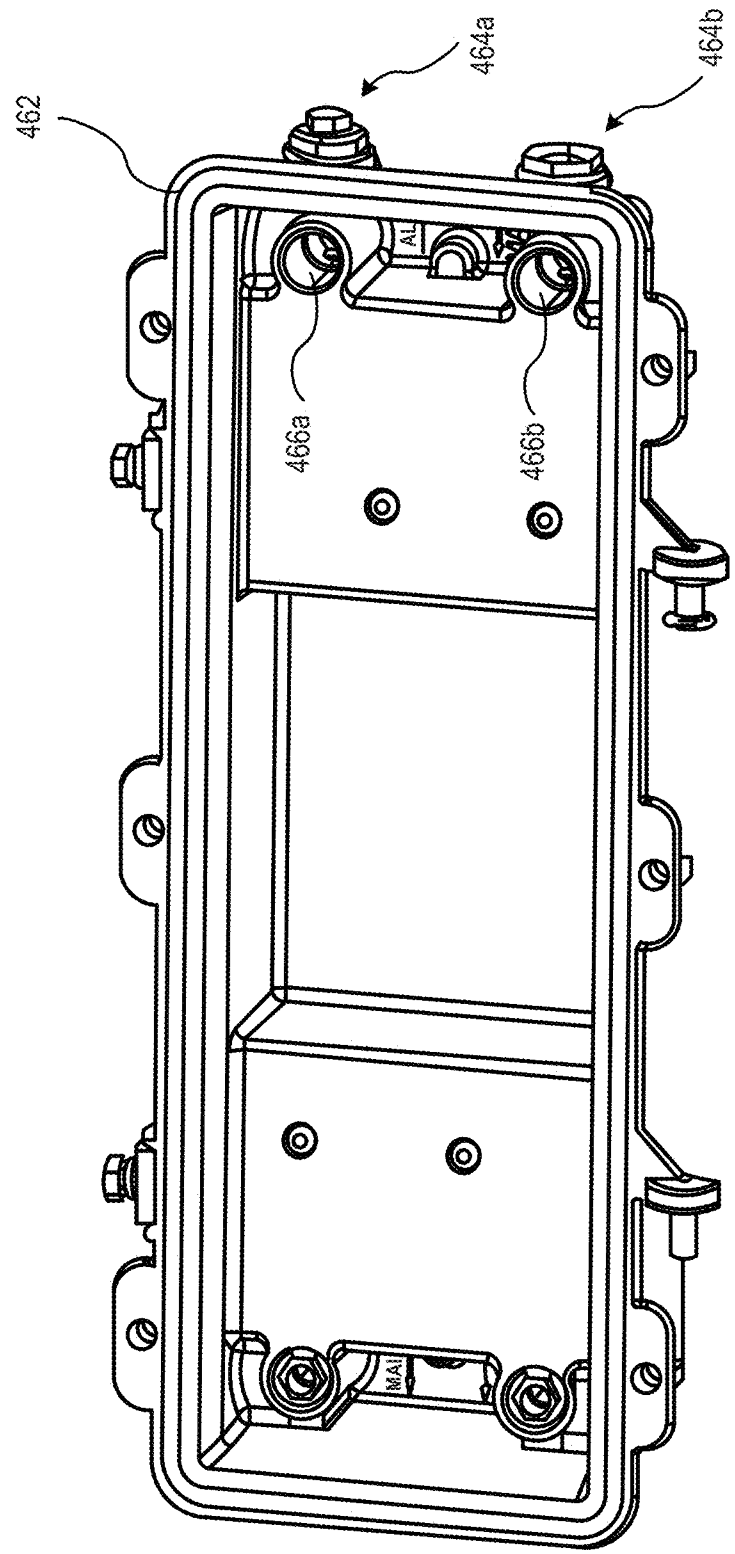
FIG. 4B is a housing portion of the HFC network amplifier shown in FIG. 8A including recessed regions for receiving coaxial cable seizure assemblies, consistent with an embodiment of the present disclosure.
Figure 5:
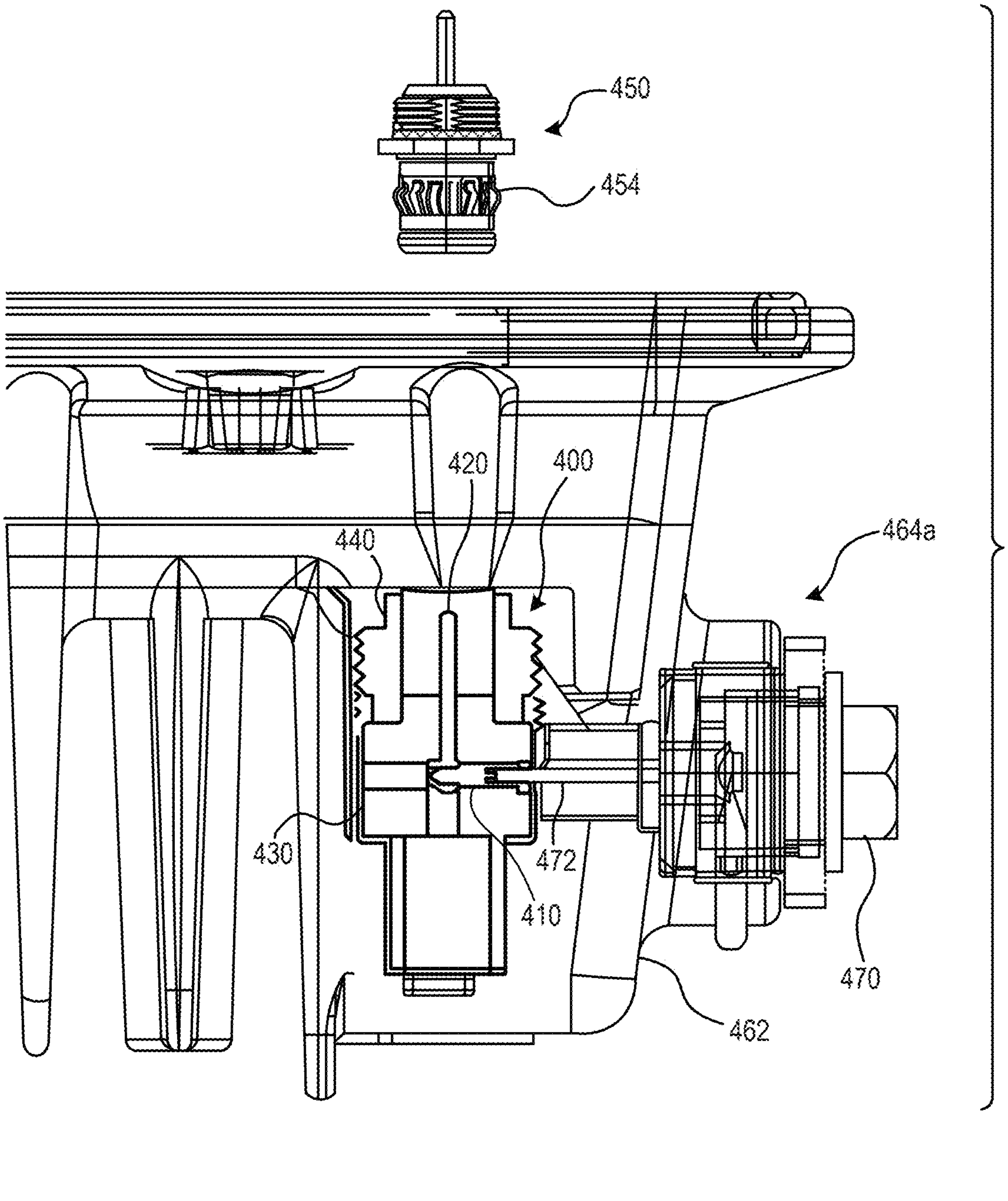
FIG. 5 is a cross-sectional view of an embodiment of the coaxial seizure assembly located in a housing portion adjacent to a coaxial cable port and connected to a coaxial cable center pin.

Referring to FIGS. 4A, 4B and 5, a coaxial cable seizure assembly may be used in an HFC amplifier 460 to provide a coaxial cable connection to cables outside of the HFC amplifier 460. The HFC amplifier 460 may include an amplifier housing 462 having coaxial cable connector ports 464*a*, 464*b* for connecting to coaxial cables. As shown in FIG. 4B, the amplifier housing 462 may include recessed regions 466*a*, 466*b* located inside of the housing 462 adjacent the respective coaxial cable connector ports 464*a*, 464*b* for receiving coaxial cable seizure assemblies, such as the coaxial cable seizure assembly 100 shown in FIGS. 1-3 and described above.

FIG. 5 shows a coaxial cable seizure assembly 400 with a multi-part conductor, consistent with the embodiments described above, may be located in a recessed region 466*a* adjacent a coaxial cable connector port 464*a*. A lock nut 440 secures an insulator portion 430 of the seizure assembly 400 in the recessed region such that a socket portion 410 of the multi-part conductor is aligned with the port 464*a* and a pin portion 420 of the stamped conductor 402 is located in an aperture defined by the lock nut 440. A coaxial cable center conductor pin 472 of a coaxial cable 470 connected to the port 464*a* passes into and engages the socket portion 410 to make an electrical connection.

A coaxial RF connector 450, such as a G-type connector, is received in the aperture defined by the lock nut 440 and engages the pin portion 420 to make an electrical connection. An inner conductive portion of the coaxial RF connector 450 receives and is electrically connected to the pin portion 420 and an outer mating portion 454 is received in the receptacle defined by the lock nut 440.

Accordingly, coaxial cable seizure assemblies with a multi-part conductor, consistent with embodiments of the present disclosure, allow an easier fabrication and provides improved impedance matching for better return loss, particularly at higher frequencies (e.g., 2 GHz).

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A seizure assembly for connecting to a coaxial cable in a hybrid fiber coaxial (HFC) network device, comprising:
- an insulator portion having a first end, a second end and a side, the insulator portion defining a pin passageway extending to the first end and a socket passageway extending from at least the pin passageway to the side;
- a pin portion fixed in the pin passageway of the insulator portion and extending from the socket passageway to beyond the first end of the insulator portion such that the pin portion protrudes from the first end, the pin portion having a pin end extending beyond the first end of the insulator portion and having a socket coupling end located in the socket passageway, wherein the socket coupling end defines an aperture, wherein the pin end is configured to mate with a coaxial RF connector in an HFC network device; and
- a socket portion separate from the pin portion and fixed in the socket passageway in contact with the pin portion, the socket portion including a pin coupling end extending into the aperture in the socket coupling end of the pin portion and having a socket end located at the side of the insulator portion, the socket end defines a cylindrical spring socket configured to receive a coaxial cable center conductor pin, wherein the pin coupling end extends into the aperture of the socket coupling end such that when coupled, the pin coupling end is circumferentially enclosed by the socket coupling end.

2. The seizure assembly of claim 1, wherein an outer diameter of the pin coupling end of the socket portion is smaller than an outer diameter of the socket end of the socket portion.

3. The seizure assembly of claim 1, wherein the pin coupling end of the socket portion engages the socket coupling end of the pin portion with an interference fit.

4. The seizure assembly of claim 1, wherein the insulator portion is made of a dielectric material.

5. The seizure assembly of claim 1 further comprising a lock nut provided at the first end of the insulator portion, wherein the pin portion extends into an aperture defined by the lock nut.

6. The seizure assembly of claim 5 wherein the lock nut is configured to threadably engage to a portion of an HFC network device.

7. The seizure assembly of claim 1, wherein the pin portion is substantially straight.

8. The seizure assembly of claim 7, wherein the socket portion and the pin portion are arranged substantially orthogonally.

9. A hybrid fiber coaxial (HFC) network device, comprising:
- a housing including at least one coaxial cable port configured to connect to a coaxial cable external to the housing; and
- a seizure assembly secured in the housing adjacent to the coaxial cable port such that a coaxial cable center conductor pin of the coaxial cable extends through the coaxial cable port and into the seizure assembly, wherein the seizure assembly comprises:
  - an insulator portion having a first end, a second end and a side, the insulator portion defining a pin passageway extending to the first end and a socket passageway extending from at least the pin passageway to the side;
  - a pin portion fixed in the pin passageway of the insulator portion and extending from the socket passageway to beyond the first end of the insulator portion such that the pin portion protrudes from the first end, the pin portion having a pin end extending beyond the first end of the insulator portion and having a socket coupling end located in the socket passageway, wherein the socket coupling end defines an aperture, wherein the pin end is configured to mate with a coaxial RF connector in an HFC network device; and
  - a socket portion separate from the pin portion and fixed in the socket passageway in contact with the pin portion, the socket portion including a pin coupling end extending into the aperture in the socket coupling end of the pin portion and having a socket end located at the side of the insulator portion, the socket end defines a cylindrical spring socket configured to receive a coaxial cable center conductor pin, wherein the pin coupling end extends into the aperture of the socket coupling end such that when coupled, the pin coupling end is circumferentially enclosed by the socket coupling end; and a lock nut at the first end of the insulator portion securing the seizure assembly in the housing, wherein the pin portion extends into an aperture defined by the lock nut.

10. The HFC network device of claim 9 wherein the socket passageway of the insulator portion aligns with the coaxial cable port of the housing such that when a coaxial cable is received in within the coaxial cable port, a conductor pin of the coaxial cable is directed toward the socket passageway.

11. The HFC network device of claim 9 wherein the lock nut is threadably engaged to the housing of the HFC network device.

12. The HFC network device of claim 9 wherein the pin coupling end of the socket portion engages the socket coupling end of the pin portion with an interference fit.

13. The HFC network device of claim 9 wherein at least a portion of the insulator portion is made of a dielectric material.

14. The HFC network device of claim 9, wherein the HFC network device is capable of signaling at frequencies up to at least 1.8 GHz.

15. The HFC network device of claim 9 wherein the pin portion is substantially straight.

16. The HFC network device of claim 15 wherein the socket portion and the pin portion are arranged substantially orthogonally.

* * * * *